(12) United States Patent
Lebonte et al.

(10) Patent No.: US 11,181,205 B2
(45) Date of Patent: Nov. 23, 2021

(54) VALVE DIAPHRAGM, DIAPHRAGM VALVE, AND METHOD FOR SECURING A DATA CARRIER CONTAINED IN A HOUSING

(71) Applicant: GEMUE GEBR. MUELLER APPARATEBAU GMBH & CO. KOMMANDITGESELLSCHAFT, Ingelfingen (DE)

(72) Inventors: Christophe Lebonte, Niedernai (FR); Rolf Meier, Ettenheim (DE); Pascal Knaus, Forchtenberg (DE); Steffen Meinikheim, Ingelfingen (DE); Gert Mueller, Ingelfingen (DE)

(73) Assignee: GEMUE GEBR. MUELLER APPARATEBAU GMBH & CO. KOMMANDITGESELLSCHAFT, Ingelfingen (DE)

( * ) Notice: Subject to any disclaimer, the term of this patent is extended or adjusted under 35 U.S.C. 154(b) by 85 days.

(21) Appl. No.: 16/407,338

(22) Filed: May 9, 2019

(65) Prior Publication Data
US 2019/0346063 A1 Nov. 14, 2019

(30) Foreign Application Priority Data
May 14, 2018 (DE) ...................... 10 2018 111 383.8

(51) Int. Cl.
| F16K 37/00 | (2006.01) |
| F16K 7/12 | (2006.01) |
| G06K 19/07 | (2006.01) |
| G06K 19/077 | (2006.01) |

(52) U.S. Cl.
CPC ............ *F16K 37/0025* (2013.01); *F16K 7/12* (2013.01); *F16K 37/0058* (2013.01); *G06K 19/0723* (2013.01); *G06K 19/07758* (2013.01)

(58) Field of Classification Search
CPC .... F16K 37/0025; F16K 37/0058; F16K 7/12; F16J 3/02; G06K 19/0723; G06K 19/07758
See application file for complete search history.

(56) References Cited

U.S. PATENT DOCUMENTS

| 6,239,737 B1 * | 5/2001 | Black .................. G06K 19/041 342/44 |
| 87,944,595 | 5/2011 | Naoki et al. |
| 8,115,639 B2 | 2/2012 | Anne |

(Continued)

FOREIGN PATENT DOCUMENTS

| DE | 20 2011 050941 U1 | 10/2011 |
| DE | 202011050941 | 10/2011 |

(Continued)

OTHER PUBLICATIONS

German Search Report, dated Feb. 2, 2019. pp. 1-9.
(Continued)

*Primary Examiner* — Atif H Chaudry
(74) *Attorney, Agent, or Firm* — Bond Schoeneck & King, PLLC; George McGuire

(57) ABSTRACT

A valve diaphragm includes a flange portion and a diaphragm portion. It is proposed that it includes a data carrier contained in a housing and that the housing is arranged on an edge of the flange portion so as to be at least partially visible when seen from outside onto the edge.

13 Claims, 9 Drawing Sheets

(56) References Cited

U.S. PATENT DOCUMENTS

| | | | |
|---|---|---|---|
| 9,542,633 | B2 | 1/2017 | Gert et al. |
| 2002/0060629 | A1* | 5/2002 | Pfeiffer ............ G06K 19/07758 340/572.8 |
| 2009/0212912 | A1 | 8/2009 | Forster |
| 2010/0050308 | A1* | 3/2010 | Roberson .............. F41H 5/0428 2/2.5 |
| 2012/0119130 | A1 | 5/2012 | Reed |
| 2018/0142806 | A1* | 5/2018 | Mueller ................... F16K 7/12 |
| 2018/0163895 | A1 | 6/2018 | Gert et al. |
| 2019/0162317 | A1* | 5/2019 | Binz ...................... F16K 51/00 |

FOREIGN PATENT DOCUMENTS

| | | |
|---|---|---|
| DE | 10 2013 214304 A1 | 1/2015 |
| DE | 102013214304 | 1/2015 |
| DE | 102013214304 A1 | 1/2015 |
| DE | 10 2015 210204 A1 | 12/2016 |
| DE | 102015210204 | 12/2016 |
| DE | 102015210204 A1 | 12/2016 |
| EP | 2 242 004 A1 | 10/2010 |
| WO | 2014 122239 A1 | 8/2014 |
| WO | WO-2016192966 A1 * 12/2016 ......... F16K 37/0041 |

OTHER PUBLICATIONS

Non translated German Search Report dated Aug. 9, 2019, pp. 1-10.
German Examination Report, dated Dec. 15, 2020. pp 1-6.

* cited by examiner

VALVE DIAPHRAGM, DIAPHRAGM VALVE, AND METHOD FOR SECURING A DATA CARRIER CONTAINED IN A HOUSING

CROSS REFERENCE TO RELATED APPLICATIONS

The present relates and claims priority to German patent application No. 102018111383.8, filed on May 14, 2018, the entire content of which is incorporated herein by reference.

The invention relates to a valve diaphragm, a diaphragm valve, and a method for securing a data carrier contained in a housing according to the preambles of the independent claims.

DE 10 2013 214 304 A1 describes a valve diaphragm. This has a laterally projecting tab, in which a data carrier is arranged. The data carrier belongs to an RFID chip in which data relating to the production and operation of the valve diaphragm are stored, which can be read out wirelessly from the outside.

The object of the present invention is to provide a valve diaphragm, a diaphragm valve and a method for securing a data carrier contained in a housing, which allows for a simple, fast, inexpensive and reliable production of the valve diaphragm and a reliable readout of the data stored on the data carrier and/or a reliable input of data.

This object is achieved by a valve diaphragm, a diaphragm valve and a method having the features of the respective independent claim. Advantageous further developments of the invention are specified in subclaims. In addition, the invention discloses essential features in the following description and in the accompanying drawings. These features may be essential to the invention, both alone and in different combinations, without this being explicitly referred to again.

Specifically, a valve diaphragm is proposed which comprises a flange portion and a mostly integral diaphragm portion with the latter. The diaphragm portion is moved by a drive transversely to the extension of the valve diaphragm and thereby the flow of a fluid is controlled. The diaphragm portion, but usually both the diaphragm portion and the flange portion, can be made of, for example, an EDPM material (ethylene-propylene-diene rubber). The flange portion surrounds the diaphragm portion and is generally clamped fluid-tight between two housing parts of a diaphragm valve. The diaphragm portion in plan view usually has an at least approximately circular contour, whereas the flange portion in the plan view often has a total approximately square or approximately circular outer contour and is bounded by an edge which is circumferential and radially outwardly facing and is at least partially planar. As it is typical for a diaphragm, the valve diaphragm has a small extension in the z-direction compared to its extension in an x-direction and a y-direction, it is therefore comparatively thin, but usually sufficiently thick to nevertheless provide an at least partly planar edge. The valve diaphragm is as an example made of a rubber material.

According to the invention, the valve diaphragm comprises an electronic data carrier contained in a housing. This preferably belongs to an RFID chip, so it can be read out wirelessly and/or be written with data. The invention deliberately turns away from the previous technique of hiding the data carrier or RFID chip as inconspicuously as possible. Instead, the housing with the data carrier according to the invention is arranged at the edge of the flange portion so that, when a user looks from radially outside onto the edge, it is at least partly visible to him.

Thus, the position of the data carrier is always visible to a user from the outside, so that a wireless reader and/or a wireless writing instrument can be placed exactly on the data carrier, whereby a secure data transfer is possible. In this case, even those very small-sized data carriers can be used, which are provided with a small-sized antenna and therefore require the smallest possible distance between the data carrier (or the antenna) and the reading and/or writing device for the data transfer.

By positioning the data carrier in a housing so that it is visible to a user from the outside, the housing can also be easily attached to a valve diaphragm in a simple manner, whereby the production costs are reduced. The housing can thereby be designed in almost any shape. For example, a total approximately cuboid shape, spherical shape, cylindrical shape, etc. is possible.

A further development of the invention is characterized in that a depression is present in or on the edge in which the housing is at least partially contained. Such a depression can, for example, be already generated during the production of the valve diaphragm, for example, during the vulcanization, whereby a unique and always consistent position is ensured for the specific valve diaphragm of the housing. With the arrangement in a recess, the housing is also protected from external influences.

A further development of the invention is characterized in that the housing protrudes from the edge. In this way, the user can locate the housing and thus the data carrier at any time, since the edge of the flange portion is always visible from the outside in conventional diaphragm valves. In addition, this is very simple and thus inexpensive to produce.

A further development of the invention is characterized in that a tab is provided on the edge, in which the housing is at least partially contained or on which the housing is placed. This makes it possible to remove the location of the attachment of the housing on the valve diaphragm from the region of the flange portion which cooperates with a housing of the diaphragm valve, so that neither the clamping is disturbed nor the housing with the data carrier is damaged by the clamping. In addition, such a tab is visually easily perceived from the outside. It is in principle possible that the tab is produced together with the valve diaphragm in a single production process, for example by vulcanization. It is also conceivable that the tab is made with the housing in a separate production process and then connected to the flange portion, for example by gluing.

The visual perceptibility of such a tab is further improved if the tab has a deviating color from the rest of the valve diaphragm, preferably an optically conspicuous color.

A further development of the invention is characterized in that at least one anchoring device for anchoring the housing to or on the flange portion is provided on the housing. By the anchoring device, a mechanical connection between the housing and the flange portion is provided, whereby the housing can be more reliably connected to the flange portion.

In a further development, it is proposed that the anchoring device comprises at least one anchoring pin. Such an item is easy to produce. It is conceivable that the anchoring pin is, for example, pressed into the flange portion for anchoring the housing.

In a further development, it is proposed that the anchoring pin has at least one form-fitting portion. As a result, the anchoring effect is further improved.

In a further development, it is proposed that the anchoring pin has at least two form-fitting portions preferably arranged one behind the other. As a result, the anchorage is further improved.

A further development of the invention is characterized in that the form-fitting portion is designed in the form of a mushroom. As a result, the housing is connected to the flange in a largely non-releasable manner—at least in a non-destructive manner.

In a further development, it is proposed that the form-fitting portion designed in the form of a mushroom is flattened laterally. This facilitates the insertion (for example, the press-fitting) of the anchoring device into the flange portion.

A further development of the invention is characterized in that the anchoring device has at least one holding portion extending at least partially in the circumferential direction of the edge. Such a holding portion thus acts as a kind of "strapping" or "clasping" and thus ensures a reliable hold of the housing on the flange. It should be noted at this point that such a holding portion is possible both in a round outer contour as well as in a substantially angular outer contour of the flange portion.

In a further development, it is proposed that the holding portion is arranged at least partially in a groove-like depression present in the edge of the flange portion. As a result, the holder of the holding portion is again more secured on the flange portion.

A further development of the invention is characterized in that an antenna is arranged in the anchoring device. The length of the antenna can be increased in this way, making the data exchange more reliable. This is especially true when the anchoring device comprises the above-mentioned holding portion.

A further development of the invention is characterized in that a predetermined breaking point is present between the anchoring device and the housing. As a result, the handling of the valve diaphragm is difficult or even impossible, since the housing with the data carrier cannot be removed from the valve diaphragm in a non-destructive manner.

A further development of the invention is characterized in that the housing is secured to the flange portion at least by a bond. An adhesion can be very easily created. If this is done in addition to the anchoring device mentioned above, the anchoring of the housing on the flange portion is thereby further improved.

In a further development, it is proposed that the bond can be activated by heating. The temperature at which the bond can be activated should be below the temperature at which the flange portion and/or the diaphragm portion of the valve diaphragm change a property. The handling is simplified with adhesive activatable by heating. For example, the adhesive can be applied to the housing in advance.

In a further development, it is proposed that a material from which the bond is produced comprises a preferably optically conspicuous dye. Thus, the bond also contributes to the easier localization of the housing and thus of the data carrier by a user.

A further development of the invention is characterized in that at least one externally visible surface of the housing has an optically conspicuous color. This also facilitates the localization of the housing and thus of the data carrier by a user.

The invention also includes a diaphragm valve whose valve diaphragm is configured as described above. It is particularly preferred if the valve diaphragm has an anchoring device with a form-fitting portion, and that a valve housing, as seen in the axial direction of the anchoring device, clamps the flange portion of the valve diaphragm outside the form-fitting portion. Thus, neither the clamping is affected by the anchoring device, nor is the anchoring device damaged by the clamping.

The invention also includes a method for securing a data carrier contained in a housing to a flat structure having an edge, in particular to a valve diaphragm, wherein the data carrier belongs in particular to an RFID chip. The inventive method is characterized in that the housing is arranged on the edge of the structure so that it is visible when seen from the outside onto the edge.

Hereinafter, embodiments of the invention will be explained with reference to the accompanying drawings, in which.

Hereinafter, functionally equivalent elements and regions in different embodiments have the same reference numerals. Normally, they will not be explained several times.

Figure 1:
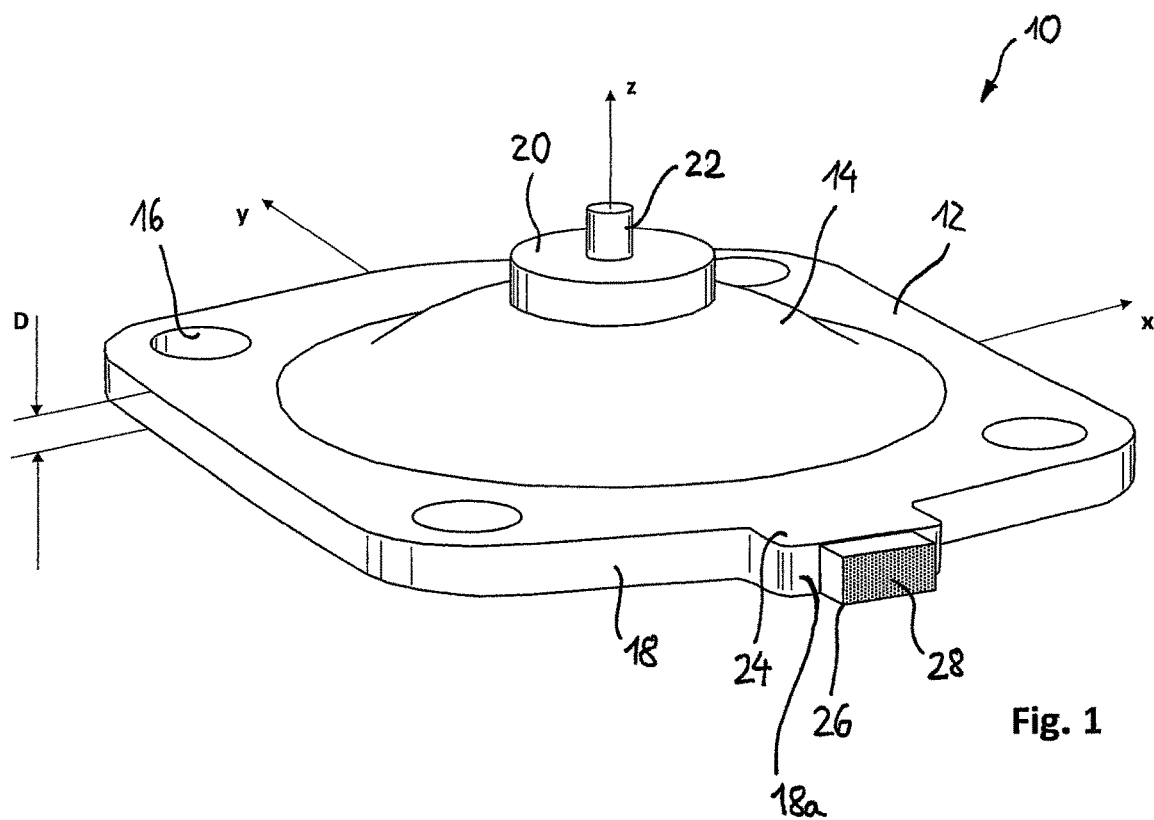
FIG. 1 is a perspective view of a first embodiment of a valve diaphragm with a diaphragm portion and a flange portion and a housing with a data carrier which is visible from outside.

A first embodiment of a valve diaphragm has the reference numeral 10 in FIG. 1. It is used in a diaphragm valve and comprises a radially outer flange portion 12 and a centric diaphragm portion 14 connected integrally with the latter. Such a diaphragm valve is described by way of example in DE 10 2015 212 997 A1, whose disclosure is therefore also made with regard to the basic structure and the basic function of a diaphragm valve which is also the subject-matter of the present application.

While the flange portion 12 is flat and planar, the diaphragm portion 14 is upwardly curved in the position shown in FIG. 1. As it will be shown below, the flange portion is clamped fluid-tight between two housing parts of the diaphragm valve when the valve diaphragm 10 is installed in a diaphragm valve. For this purpose, four passage holes 16 are present in the flange portion 12, that can be passed through by the screws, which clamp the two housing parts together. For reasons of clarity, only one passage opening is provided with a reference numeral in the figures.

It can be seen from FIG. 1 that the diaphragm portion 14 has an approximately circular outer contour in plan view, whereas in the plan view in the exemplary embodiment shown in FIG. 1 the flange portion 12 has an overall approximately quadrangular outer contour. This is limited by a circumferential and radially outwardly facing and present exemplary flat edge 18. It can also be seen from FIG. 1 that the valve diaphragm 10 is comparatively thin, that is, has a significantly smaller extent in a z-direction than in an x-direction and a y-direction. Nevertheless, the valve diaphragm 10 as a whole is sufficiently thick (thickness D in FIG. 1) that the edge 18 forms a substantially smooth flat surface.

In the middle of the diaphragm portion 14, a portion 20 is arranged here by way of example, from which a threaded pin 22 extends upwards in the z-direction. This serves, for example, to connect with a not shown actuating element of an electric, pneumatic, hydraulic or manual drive, also not shown, by means of which the valve diaphragm 10 can be moved along the z-direction. By such a movement, the flow of a fluid can be controlled by means of the valve diaphragm 10. The flange portion 12 and the diaphragm portion 14 are herein exemplified made as a whole by vulcanization of a rubber material.

In the embodiment of FIG. 1, on the edge 18 on the side facing the observer in FIG. 1, there is a tab 24 which is integral with the flange portion 12 and has an approximately rectangular oblong contour in plan view (opposite to the z-direction) having a planar lateral straight edge portion 18a which is radially outwardly facing. On this edge portion 18a, a housing 26 formed by way of example by a rectangular parallelepiped is fixedly arranged or mounted. In the housing 26, an RFID chip, not shown in the drawing, is added. It can be seen from FIG. 1, that the housing 26 is placed on the edge portion 18a so that it protrudes from the same.

The housing 26 is preferably made of plastic and has a cavity in which the RFID chip is arranged. It is also possible that the RFID chip is injected into the housing 26 during its production, for example by an injection molding process. In any case, the RFID chip is contained in the housing 26 in such a way that it cannot be removed from the housing 26 in a non-destructive manner.

An RFID chip may include, for example, a transponder with an antenna, as well as a data carrier. The coupling of the RFID chip with a reading and/or writing device is done by magnetic alternating fields generated by the reading and/or writing device in a short range or by high-frequency radio waves. This does not only allow data to be transmitted, but the transponder can also be supplied with energy. The reading and/or writing device contains software that controls the actual reading and/or writing process, and an RFID middleware with interfaces to other computer systems and databases. Data can be stored on the RFID chip, which are related both to the production of the valve diaphragm 10 and its operation.

It can easily be seen from FIG. 1 that the housing 26 is arranged on the edge portion 18a of the frame 18 of the valve diaphragm 10 in such a way that it is completely visible from the outside (for example, seen in the y direction). In order to improve this visibility even further, an outer surface 28 of the housing 26 shown by dots in FIG. 1 has an optically conspicuous color.

Figure 2:
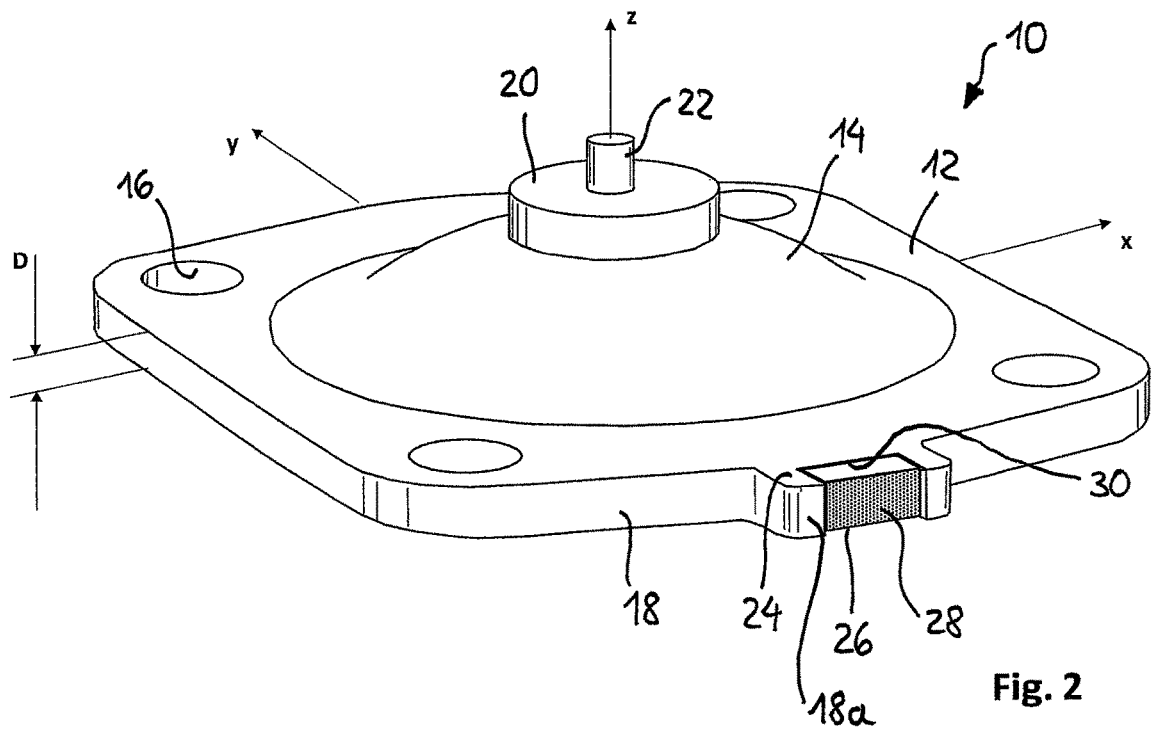
FIG. 2 shows a representation of a second embodiment of a valve diaphragm similar to FIG. 1.

FIG. 2 shows a second embodiment of a valve diaphragm 10. In this case, the housing 26 is not placed on the edge portion 18a of the frame 18 of the flange portion 12 and the tab 24 but contained in a recess 30 formed in the tab 24. The depth of the recess 30 in the y-direction is, for example, slightly larger than the corresponding dimension of the housing 26. In principle, however, it could also be equal to or smaller than the corresponding dimension of the housing 26, so that in the latter case the housing 26 would project beyond the edge portion 18a of the tab 24. The dimension of the housing 26 in the z-direction corresponds approximately to the thickness D of the valve diaphragm 10, but it could also be larger or smaller.

Figure 3:
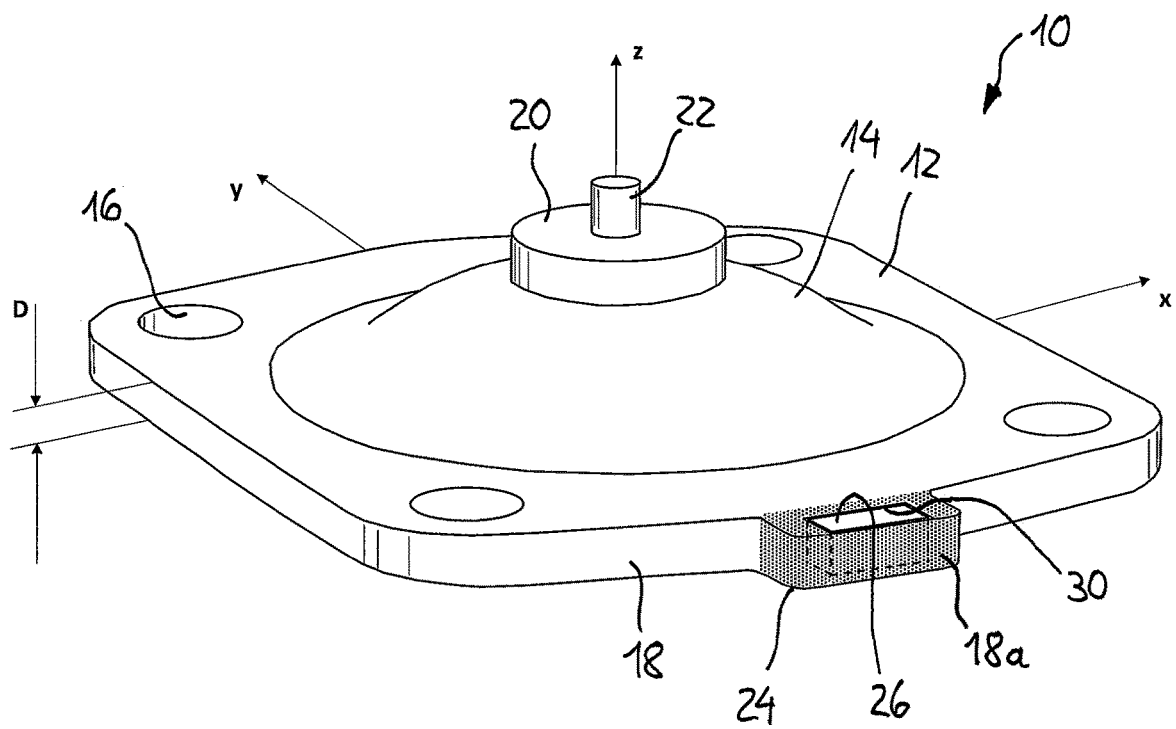
FIG. 3 is a view of a third embodiment of a valve diaphragm similar to FIG. 1.

FIG. 3 shows a third embodiment of a valve diaphragm 10. In this case, the housing 26 is completely contained in the tab 24 and is completely surrounded by the material of the tab 24 in the x-direction and in the y-direction. However, the top of the housing 26 and the underside not visible in FIG. 3 are free of the material of the tab 24 and therefore visible from the outside.

In particular, in the embodiment of FIG. 3, the tab 24 can first be prepared as a separate part from a flange portion 12 of the valve diaphragm 10, and insofar, for example, it can have an optically conspicuous color deviating from the rest of the valve diaphragm 10, which in FIG. 3 is indicated by a dotted representation of the surfaces of the tab 24. After the production and integration of the housing 26 in the recess 30 of the tab 24, the tab 24 is then, for example, glued to the edge 18 of the flange portion 12.

Figure 4:
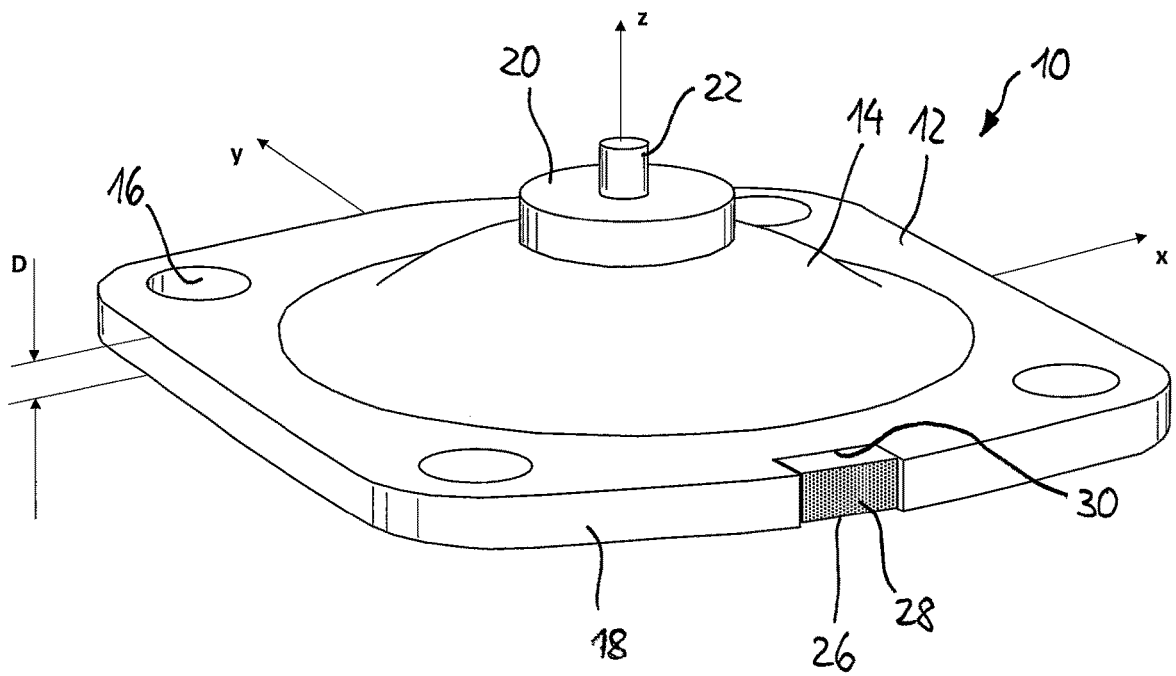
FIG. 4 is a view of a fourth embodiment of a valve diaphragm similar to FIG. 1.

FIG. 4 shows a fourth embodiment of a valve diaphragm 10. This does not comprise a tab. Instead, the recess 30 is directly present in the edge 18 of the flange portion 12, and the housing 26 with the RFID chip is disposed in this recess 30. In order not to disturb the clamping of the flange portion 12 by the housing parts of the diaphragm valve, it is advantageous in this variant, when the extension of the housing 26 in the z-direction is smaller than the thickness D of the flange portion 12.

Figure 5:
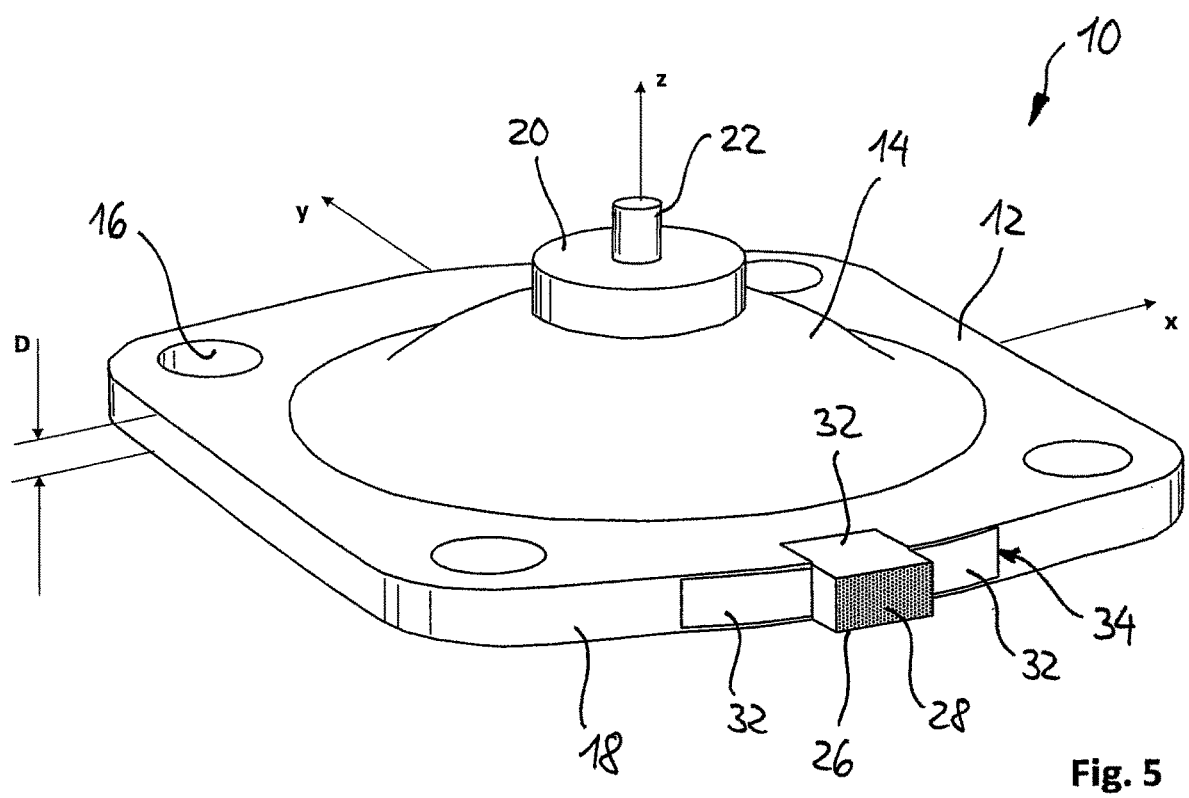
FIG. 5 shows a representation of a fifth embodiment of a valve diaphragm with a visible first type of anchoring direction of the housing similar to FIG. 1.

FIG. 5 shows a fifth embodiment of a valve diaphragm 10. Also, in this case no tab on the flange portion 12 is present. Instead, the housing 26 is placed on the edge 18 of the flange portion 12, thus protrudes from the same. In the present example, wing-like adhesive portions 32 are drawn, which extend from the housing 26 and which connect the housing 26—at least also—with the flange portion 12. These adhesive portions 32 belong in total to an anchoring device 34, which attaches the housing 26 non-releasably to the flange portion 12 of the valve diaphragm 10. "Non-releasably" means that a releasing of the housing 26 from the flange portion 12 is not possible, at least not without damaging the housing 26, the anchoring device 34 and/or the flange portion 12.

Figure 6:
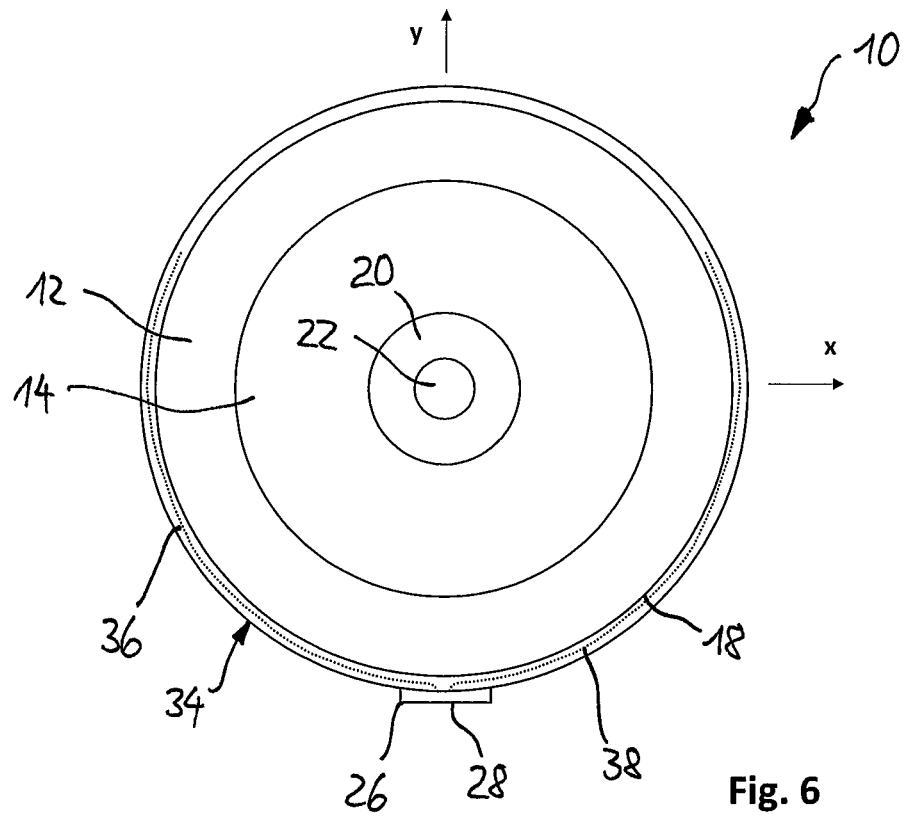
FIG. 6 shows a plan view of a sixth embodiment of a valve diaphragm with a visible second type of anchoring device of the housing.

FIG. 6 shows a sixth embodiment of a valve diaphragm 10. Unlike the valve diaphragms 10 of FIGS. 1-5, in the embodiment of FIG. 6 the flange portion 12 does not have an overall substantially quadrangular outer contour, but rather a circular outer contour. Similar to the embodiment of FIG. 5, the housing 26 is placed from the outside on the edge 18 of the flange portion 12, thus it protrudes from the same. On the housing 26, a holding portion 36 extending in the circumferential direction of the edge 18 integrally formed in the form of a closed ring which is seated in a press fit on the edge 18 of the flange portion 12 and insofar the housing 26 is—at least also—anchored to the flange portion 12. The holding portion 36 thus belongs to the anchoring device 34. In order to prevent slippage of the holding portion 36 in the direction of the z-axis, in the edge 18 of the flange portion 12, a circumferential groove-like depression (not shown) may be present, in which the annular holding portion 36 is at least partially arranged.

An antenna 38 of the RFID chip contained in the housing 26 may extend in the present case on both sides of the housing 26 along the annular holding portion 36. This makes it possible to communicate wirelessly with a reading and/or writing device with the RFID chip, even if the reading and/or writing device is not arranged directly on the housing 26.

Figure 7:
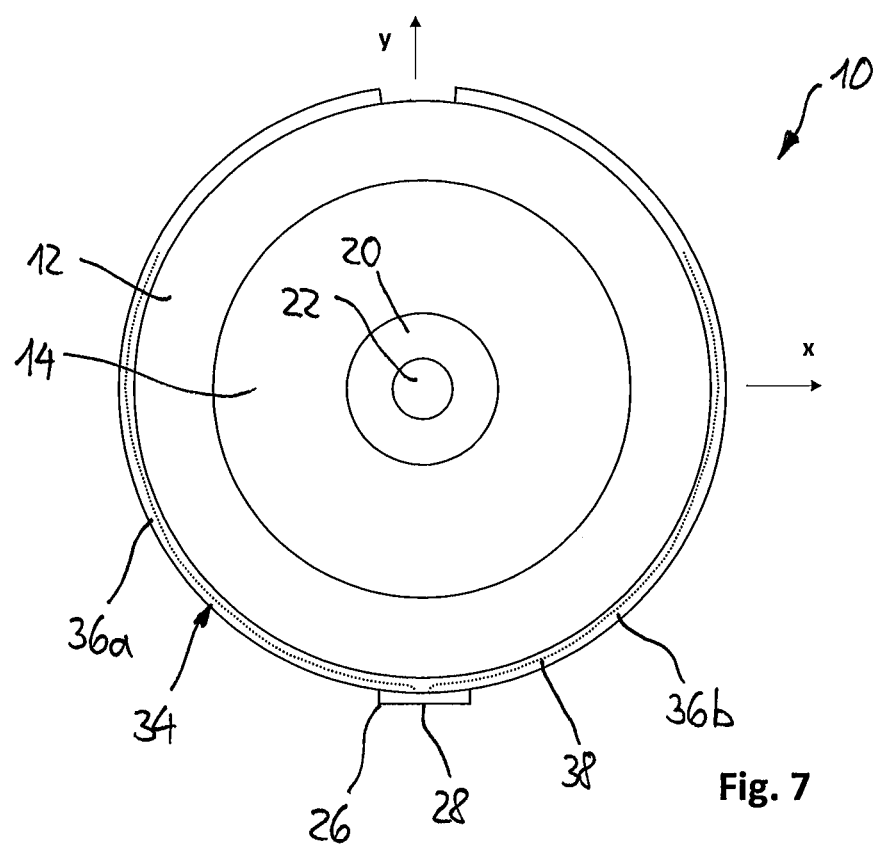
FIG. 7 shows a plan view of a seventh embodiment of a valve diaphragm; with a visible third type of anchoring device of the housing

FIG. 7 shows a seventh embodiment of a valve diaphragm 10 which is very similar to that of FIG. 6. However, the anchoring device 34 does not comprise an annular closed holding portion, but two holding portions 36a and 36b, which are formed as ring segments. In this way, an expansion of the circumference of the flange portion 12 can be collected when it is jammed between two housing parts of the diaphragm valve.

Further embodiments of anchoring devices 34 are shown in FIGS. 8-13, wherein the anchoring devices 34 shown there comprise respectively differently configured anchoring pins 40. These are preferably made of plastic, integrally formed with the housing 26 (for example, by plastic injection), protrude from the housing 26 in the material of the flange portion 12 not shown in the figures and extend in the installed position in the y-direction (FIGS. 1-5). Preferably, the anchoring pin 40 is pressed into a preformed opening in the material of the flange portion 12 during the assembly of the housing 26 on the flange portion 12. However, as it will be shown below by way of example in connection with the specific embodiment of FIG. 15, this is not absolutely necessary.

Figure 8:
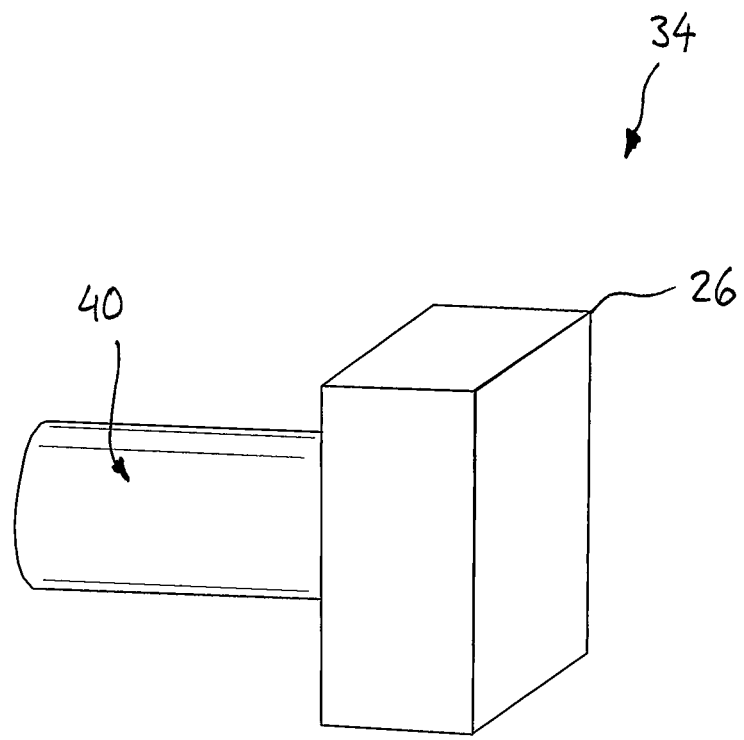
FIG. 8 shows a perspective view of a housing with a fourth type of anchoring device.

The anchoring pin 40 shown in FIG. 8 represents the simplest form of anchoring pin 40, namely, it is designed as a simple straight cylinder. It may be solid, i.e. be filled in its interior with material, or it may have an annular cross-section with an open end projecting from the housing 26. In this case, a preformed annular aperture or slot extending from the edge 18 of the flange portion 12 and extending in the y-direction would be advantageous in order to drive the anchoring pin 40 more easily into the material of the flange portion 12.

The anchoring pins 40 shown in FIGS. 9-13 all have a form-fitting portion 42, which anchors the housing 26—at least also—by form-fittingly locking into the material of the flange portion 12 and is formed on the projecting end of a cylindrical connecting portion 44. All form-fitting portions 42 shown in FIGS. 9-13 are designed in the form of mushrooms. In principle, it would be conceivable alternatively or additionally to this, to provide a corrugation (not shown) or barbs portions (also not shown) or the like on the lateral surface of the connecting portion 44, which make it harder to pull out the anchoring pin 40 from the material of the flange portion 12 after driving the anchoring pin 40 into the material.

Figure 9:
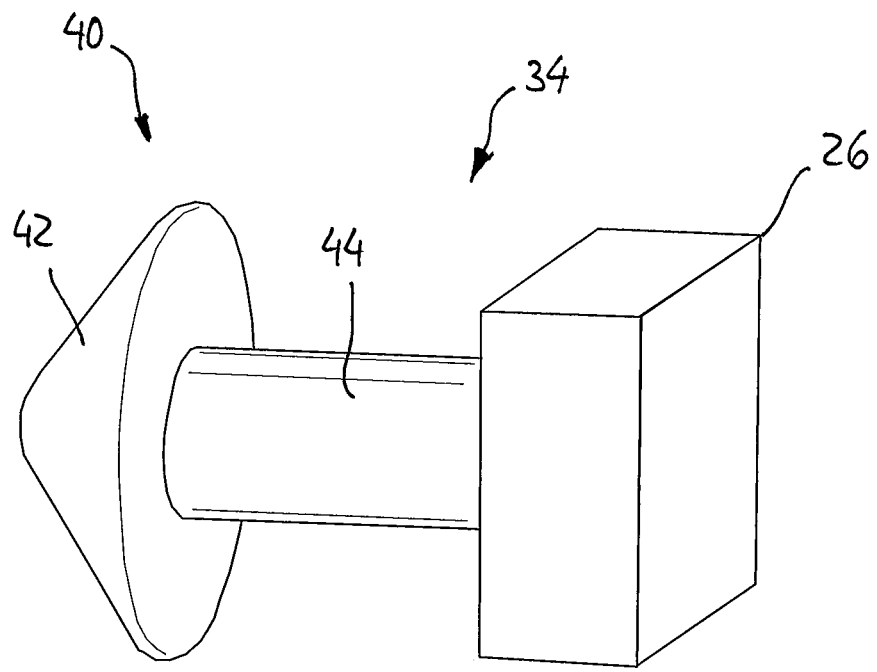
FIG. 9 shows a representation similar to FIG. 8 with a fifth type of anchoring device.
Figure 10:
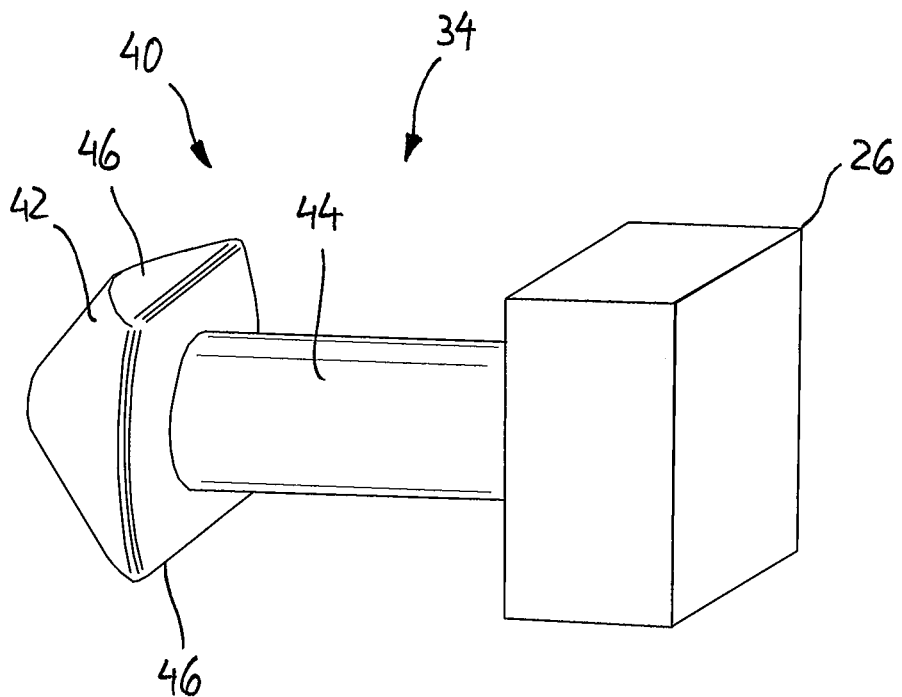
FIG. 10 shows a representation similar to FIG. 8 with a sixth type of anchoring device.
Figure 11:
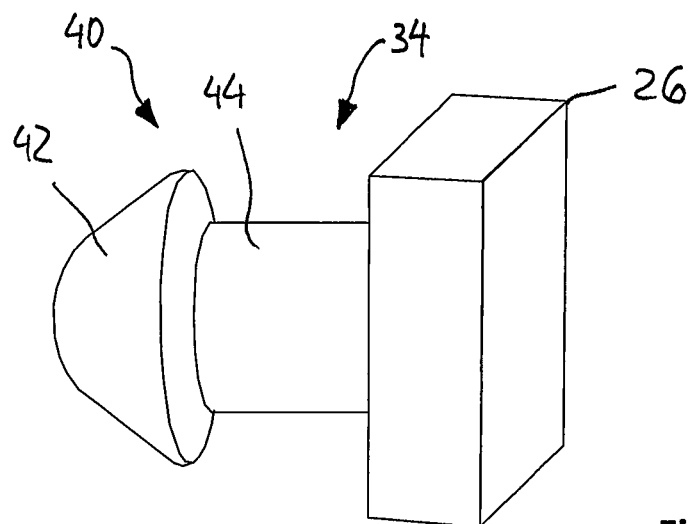
FIG. 11 shows a representation similar to FIG. 8 with a seventh type of anchoring device.
Figure 12:
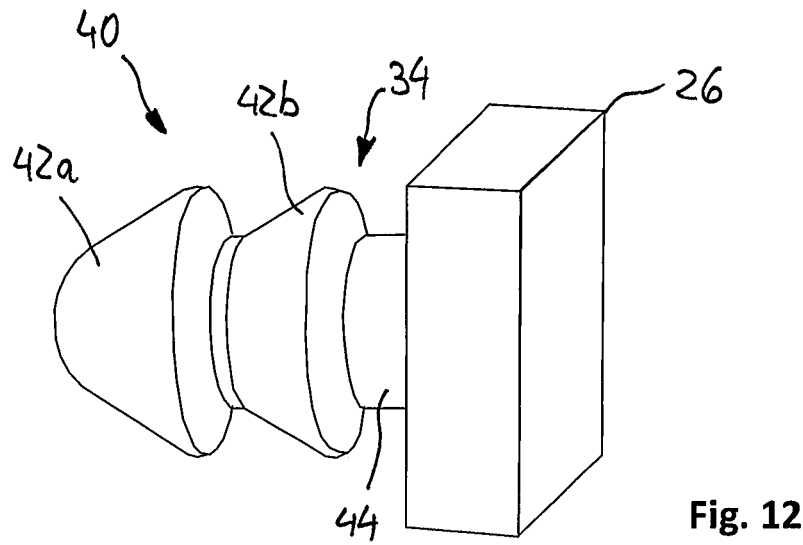
FIG. 12 shows a representation similar to FIG. 8 with an eighth type of anchoring device.
Figure 13:
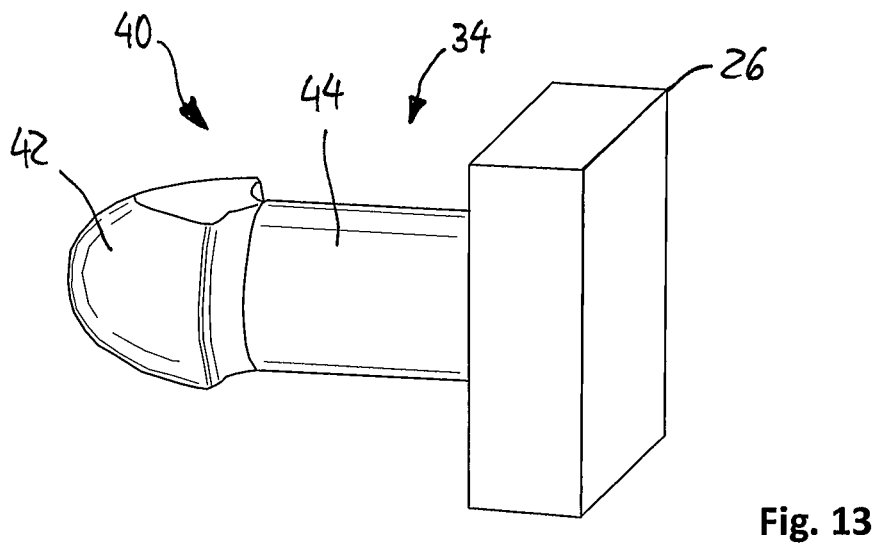
FIG. 13 shows a representation similar to FIG. 8 with a ninth type of anchoring device.

The form-fitting portion shown in FIG. 9 has the shape of a classic cone point. The form-fitting portion 42 shown in FIG. 10 is similar thereto, but laterally flattened (reference numeral 46). The form-fitting portion 42 shown in FIG. 11 is similar to that of FIG. 9, but with a more rounded tip. The anchoring pin 40 shown in FIG. 12 has two form-fitting portions 42a and 42b arranged axially one behind the other, similar to that of FIG. 11. The form-fitting portion 42 drawn in FIG. 13 is again similar to that of FIG. 11, and in turn has two lateral flattenings 46.

Figure 14:
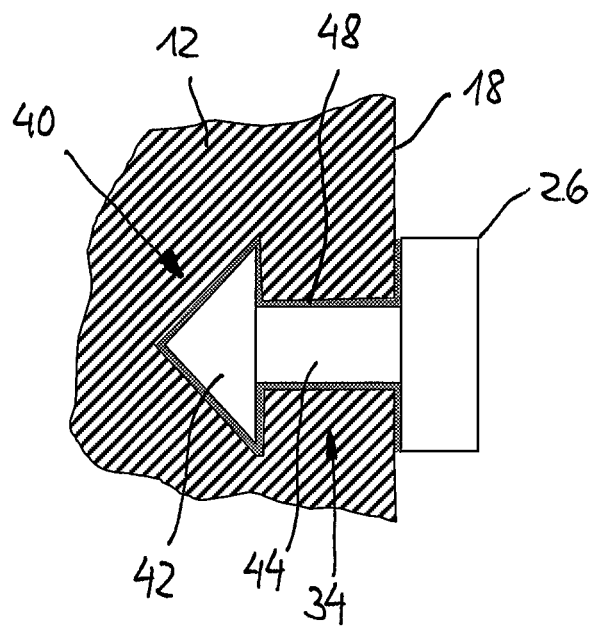
FIG. 14 shows a partial section through a valve diaphragm with a housing with a tenth type of anchoring device.
Figure 15:
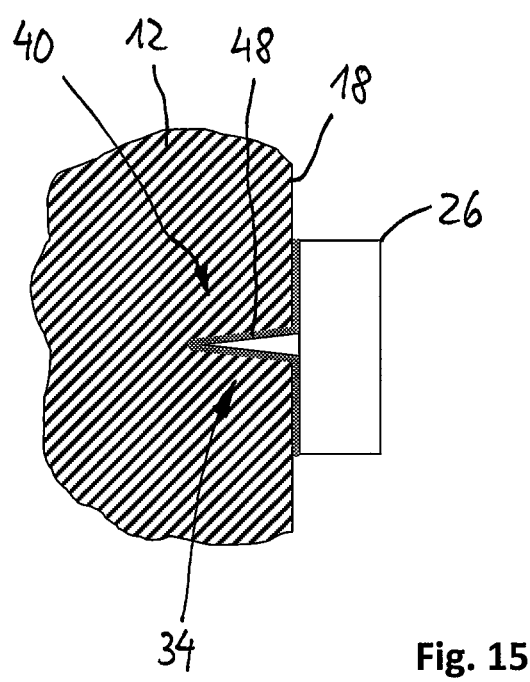
FIG. 15 shows a partial section through a valve diaphragm with a housing with an eleventh type of anchoring device.

The anchoring devices 34 shown in FIGS. 14 and 15 have, in addition to an anchoring pin 40, an adhesive 48 formed by a dotted adhesive layer, which additionally anchors the anchoring pin 40 on or in the material of the flange section 12 and thus secures the housing 26 on the flange section 12 permanently. In this case, such a material is advantageously selected for the adhesive layer 48, which initially has no adhesive property at room temperature.

In this way, the adhesive layer 48 can, for example, be applied in advance on the surface of the anchoring pin 40 and/or the edge 18 of the flange portion 12 facing surface of the housing 26 without the bond 48 hindering the penetration of the anchoring pin 40 in the material of the flange portion 12 and/or very generally, without hindering the handling of the housing 26 together with the anchoring device 34. Only by a subsequent increase in temperature, with a housing 26 already arranged on the flange portion 12 and/or an anchoring pin 40 arranged in the flange portion 12, the activation temperature of the bond 48 is exceeded, causing the temperature to bond the anchoring pin 40 and/or the housing 26 to the material of the flange portion 12.

In connection with FIG. 15, it should be pointed out that the anchoring pin 40 drawn there is designed as a simple pointed mandrel which can be pressed or driven comparatively easily into the material of the flange portion 12 without there being an opening for receiving the anchoring pin 40 prior to that. In this way, the housing 26 can be very easily secured to the flange portion 12, to then be secured, ultimately non-releasably, by an activation of the bond 48 at the edge 18 of the flange portion 12.

It is basically conceivable that the material from which the bond 48 is made also comprises an optically conspicuous dye. The exit of liquefied adhesive 48 upon lateral activation can be easily recognized and also serves to mark the point at which the housing 26 is disposed on the flange portion 12.

Figure 16:
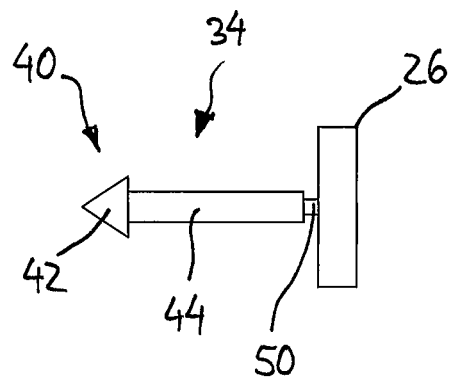
FIG. 16 shows a side view of a housing with a twelfth type of anchoring device.

FIG. 16 shows a side view of a housing 26 with an anchoring device 34, which is fundamentally similar to that of FIG. 9. In addition, however, between the connecting portion 44 and the housing 26, a predetermined breaking point 50 is present, which is presently formed by a portion with a smaller diameter. Alternatively or additionally, the predetermined breaking point 50 can also be formed by another material or a special structure. If, after securing the housing 26 to the flange portion 12, an attempt is made to remove the housing 26 from the flange portion 12, this predetermined breaking point 50 breaks at a tensile force that is less than that force required to pull out again the form-fitting portion 42 from the material of the flange portion 12.

Figure 17:
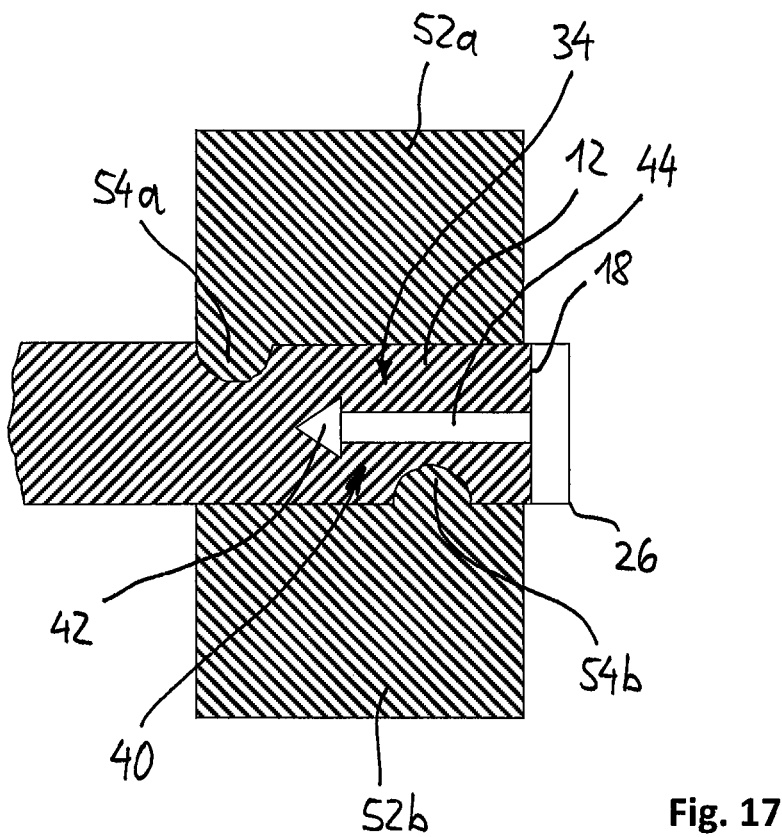
FIG. 17 shows a partial section through a valve diaphragm, a housing with a fifth type of anchoring device and parts of a valve housing.

FIG. 17 shows the flange portion 12 of a valve diaphragm 10, a housing 26 with an anchoring device 34, and two housing parts 52a and 52b of a housing of a diaphragm valve in a lateral section corresponding to a y-z-plane, for example of FIG. 1. In order to achieve a fluid-tight seal, the two housing parts 52a and 52b have respective clamping beads 54a and 54b. It can be seen from FIG. 17 that the upper clamping bead 54a clamps the flange portion 12 at a radially inner point viewed from the form-fitting portion 42, whereas the lower clamping bead 54b in FIG. 17 clamps the flange portion 12 at a radially outer point seen from the form-fitting portion 42. Overall, it can therefore be said that the clamping of the flange portion 12 takes place through the two housing parts 52a and 52b outside of the form-fitting portion 42.

It is understood that the anchoring devices 34 explained above in connection with FIGS. 8-17 can be used individually or in combination for securing the housing 26 to the valve diaphragms 10 shown in FIGS. 1 to 7. In particular in connection with the above-mentioned bond 48, it should be noted that this can be used in principle without the use of an anchoring pin 40.

What is claimed is:

1. Valve diaphragm, comprising a flange portion and a diaphragm portion, characterized in that it comprises an electronic data carrier contained in a housing, wherein the housing is attached to a circumferential and radially outwardly facing and at least regionally planar edge of the flange portion so as to be at least partially visible when seen from outside onto the edge.

2. Valve diaphragm according to claim 1, characterized in that the housing protrudes from the edge.

3. Valve diaphragm according to claim 1, characterized in that on the housing at least one anchoring device is present for anchoring the housing on or in the flange portion.

4. Valve diaphragm according to claim 3, characterized in that the anchoring device comprises at least one anchoring pin.

5. Valve diaphragm according to claim 4, characterized in that the anchoring pin has at least one form-fitting portion.

6. Valve diaphragm according to claim 5, characterized in that the anchoring pin has at least two successively arranged form-fitting portions.

7. Valve diaphragm according to claim 5, characterized in that the form-fitting portion is designed in the form of a mushroom.

8. Valve diaphragm according to claim 7, characterized in that the form-fitting portion designed in the form of a mushroom has a lateral flattening.

9. Valve diaphragm according to claim 3, characterized in that a predetermined breaking point is present between the anchoring device and the housing.

10. The valve diaphragm according to claim 1, wherein the data carrier belongs to an RFID chip.

11. Diaphragm valve characterized in that it comprises a valve diaphragm comprising a flange portion and a diaphragm portion, characterized in that it comprises an electronic data carrier contained in a housing, wherein the housing is attached to a circumferential and radially outwardly facing and at least regionally planar edge of the flange portion so as to be at least partially visible when seen from outside onto the edge.

12. Diaphragm valve according to claim 11, characterized in that the valve diaphragm has an anchoring device with a form-fitting portion, and in that a valve housing clamps the flange portion of the valve diaphragm in the axial direction of the anchoring device when seen from outside of the form-fitting portion.

13. The diaphragm valve according to claim 11, wherein the data carrier belongs to an RFID chip.

\* \* \* \* \*